Sept. 8, 1925.  
C. J. MANNING  
PRESSURE GAUGE  
Filed Dec. 11, 1923  
1,552,861
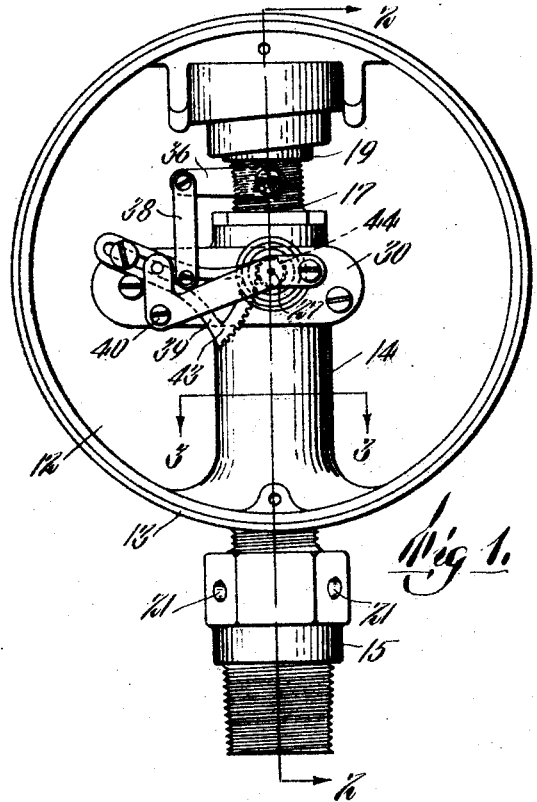
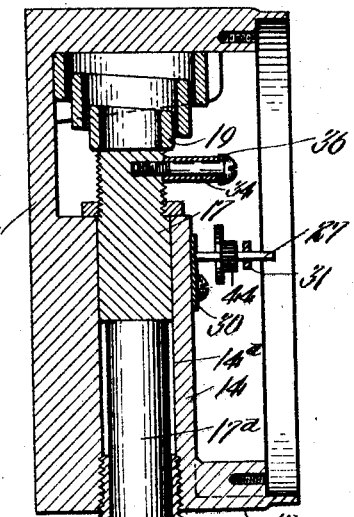
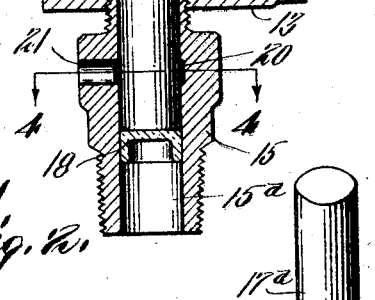
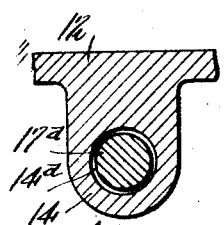
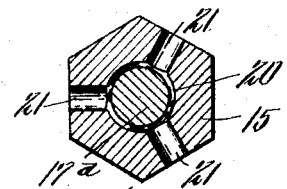
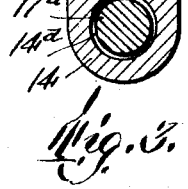
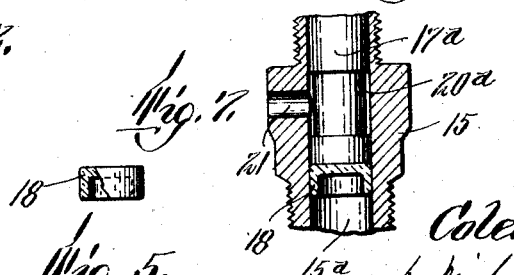
Inventor:  
Coleman J. Manning  
by Wright Brown Quinby May  
Att'ys.

Patented Sept. 8, 1925.

1,552,861

UNITED STATES PATENT OFFICE.

COLEMAN J. MANNING, OF MEDFORD, MASSACHUSETTS.

PRESSURE GAUGE.

Application filed December 11, 1923. Serial No. 679,894.

*To all whom it may concern:*

Be it known that I, COLEMAN J. MANNING, a citizen of the United States, residing at Medford, in the county of Middlesex and State of Massachusetts, have invented new and useful Improvements in Pressure Gauges, of which the following is a specification.

This invention relates particularly to a pressure gauge, the registering mechanism of which includes a pointer-carrying arbor, and torque-transmitting connections between said arbor and the means directly actuated and moved by variations of pressure, said connections including small toothed gear members such as a pinion on the arbor, and a toothed sector meshing with said pinion.

In my Patent No. 1,372,182, dated March 22, 1921, I disclose as a means directly acted on by a medium whose variations of pressure are indicated, a fixed cylinder in the gauge casing, a piston which is movable in one direction in said cylinder by increments of pressure, and in the opposite direction by a spring, the piston being connected by torque-transmitting means with the pointer-carrying arbor, and operating the latter and the pointer without objectionable vibration or fluctuation of the pointer, so that the pointer is free from lost motion or uncertain vibration, and always indicates exactly the degree of pressure.

The present invention has for its object to provide certain improvements in a gauge of the character above indicated, said improvements including means for preventing liquid, leaking around the piston, from entering the casing and interfering with the mechanism therein, and for permitting such liquid to escape visibly at a point outside the casing, so that leakage may be readily detected.

The invention is embodied in the improvements which I will now proceed to describe and claim.

Of the accompanying drawings forming a part of this specification,

Figure 1 is a front elevation of a pressure gauge embodying the invention, the dial and pointer being removed.

Figure 2 is a section on line 2—2 of Figure 1.

Figure 3 is a fragmentary section on line 3—3 of Figure 1.

Figure 4 is a section on line 4—4 of Figure 2.

Figure 5 is a side view, partly in section, the packing member or cup washer shown by Figure 2.

Figure 6 is a perspective view of one of the members of the piston shown by Figure 2.

Figure 7 is a fragmentary view showing a modification.

The same reference characters indicate the same parts in all the figures.

The casing of the gauge as here shown, includes a back 12, and a circular wall 13. The casing is provided with an elongated fixed cylinder, partially within and partially projecting outward from the casing. Said cylinder is preferably composed of two members or sections, viz, a tubular inner member 14, cast on the back 12 and wall 13, as an integral part of the casing, and provided with a longitudinal bore 14ª and a tubular outer member or section formed as a nipple 15, having a bore 15ª coaxial with the bore 14ª. The nipple has a screw-thread engagement at its inner end with the casing, and its outer end is screw threaded for engagement with a tubular conduit member (not shown). The inner end of the cylinder opens into the casing.

A piston having a close sliding fit in the cylinder, is adapted to be moved therein in one direction by pressure of liquid in the cylinder. The piston is preferably composed of an inner member or section 17, and an outer member or section 17ª contacting loosely with the inner member, the length of the piston being such that its inner end projects above the corresponding end of the cylinder into the casing, and its lower end is spaced from the outer end of the cylinder, sufficiently to permit the insertion of a packing member 18 into the outer end of the cylinder. Said packing member is preferably a cup washer of leather or other suitable material, and has a close sliding fit in the bore of the cylinder, the packing member bearing on the lower end of the piston and being movable with the latter, the piston and packing member having a limited path of movement in the cylinder. Movement in one direction is caused by liquid pressure entering the outer end of the cylinder, and movement in the opposite direction is caused by a spring 19 interposed between a fixed abutment in the casing and the inner end of the piston, as shown by Figure 2, and as disclosed by my above-mentioned patent.

The gauge is provided with an outlet passage extending from a portion of the cylinder above the path of the packing member 18, to a point outside the casing, said passage permitting any liquid which may leak across the packing member to escape without entering the casing, the escaping liquid being visible, so that leakage may be readily detected. The arrangement of the outlet passage is such that it receives all possible leakage before the same can reach the inner end of the cylinder and flow into the casing, so that the filling of the casing with liquid, which has been possible heretofore, is prevented.

The outlet passage is preferably formed in the nipple 15, and preferably includes an annular groove 20, constituting an enlargement of the nipple bore and a duct or ducts 21 extending from said groove to the external surface of the nipple. In this instance three radial ducts are provided as shown by Figure 4, so that leakage may be detected by an observer at different locations.

The gauge may include any suitable registering mechanism, adapted to be operated by movements of the piston, the registering mechanism here shown being organized as shown by my above-mentioned patent and comprising an arbor 27 which carries the usual pointer, and is journaled in bearings in a fixed frame which includes a plate 30 attached to the cylinder 14, and a plate 31 connected with and spaced from the plate 30.

Torque is transmitted from the piston to the arbor by a stud 34, attached to the piston, an arm 36 fixed to the stud 34, a link 38 pivoted to the arm 36, and a lever 39, fulcrumed at 40 on the frame above described, and pivoted to the link 38, a gear-toothed segment 43 formed on the lever 39, and a pinion 44 fixed to the arbor 27.

As described in my above-mentioned patent, the packing member 18 formed as a cup washer, constitutes a frictional retarding member, movable with the piston in frictional contact with the cylinder, whereby any spasmodic endwise movement of the piston and vibration of the registering mechanism is prevented, the pointer 28 coming to rest without fluctuation, after a change of the position of the piston.

The cup washer 18, preferably bears loosely on and is separable from the piston, instead of being attached thereto by a screw, so that it may be conveniently removed and replaced by another.

Instead of forming a groove 20 in the bore of the cylinder as above described, I may form a groove 20$^a$ in the periphery of the piston member 17$^a$, as shown by Figure 7, said groove and the bore of the cylinder constituting an annular passage portion to communicate with the ducts 21 in all positions of the piston.

I claim:

A pressure gauge comprising a casing, a tubular member within and rigid with the casing; a tubular nipple fixed to and projecting from the casing and having a bore coaxial with the bore of said tubular member, said nipple and tubular member collectively constituting an elongated cylinder; a piston movable in one direction in the cylinder by fluid pressure entering the nipple; a packing member fitting the nipple bore, bearing on the outer end of the piston, and movable with the latter; a fixed abutment in the casing; a spring seated on said abutment and adapted to move the piston in the opposite direction; and a leak indicator composed of an outlet passage having an annular portion surrounding the piston above the path of the packing member and a plurality of ducts extending from the annular portion and opening into the atmosphere at the external surface of the nipple outside the casing, said indicator permitting liquid leaking across the packing member to visibly escape into the atmosphere at a plurality of points and thus indicate such leakage.

In testimony whereof I have affixed my signature.

COLEMAN J. MANNING.